United States Patent [19]

Okamoto et al.

[11] Patent Number: 5,276,540
[45] Date of Patent: Jan. 4, 1994

[54] ACTIVE MATRIX SUBSTRATE WITH CONDUCTIVE FILM COVERING TRANSPARENT CONDUCTIVE FILM PORTION CONNECTING ADDITIONAL AND NON-ADDITIONAL CAPACITANCE PORTIONS OF PIXEL ELECTRODE

[75] Inventors: Masaya Okamoto, Nara; Mikio Katayama, Ikoma; Yuzuru Kanemori, Tenri; Katsuhiro Kawai, Yamatotakada; Hiroshi Fujiki, Tenri; Makoto Tachibana, Nara, all of Japan

[73] Assignee: Sharp Kabushiki Kaisha, Osaka, Japan

[21] Appl. No.: 800,826

[22] Filed: Nov. 29, 1991

[30] Foreign Application Priority Data

Nov. 30, 1990 [JP] Japan ................ 2-338883

[51] Int. Cl.⁵ ........................... G02F 1/1343
[52] U.S. Cl. ........................ 359/59; 359/54; 359/55; 359/57
[58] Field of Search ................ 359/54, 55, 59, 57

[56] References Cited

U.S. PATENT DOCUMENTS

| | | | |
|---|---|---|---|
| 4,855,805 | 8/1989 | Yamazaki et al. | 357/58 |
| 4,955,697 | 9/1990 | Tsukada et al. | 350/332 |
| 4,961,629 | 10/1990 | Kato | 359/54 |
| 4,991,939 | 2/1991 | Momose et al. | 350/333 |
| 5,042,918 | 8/1991 | Suzuki | 359/59 |
| 5,047,819 | 9/1991 | Tanaka et al. | 357/23.7 |
| 5,062,690 | 11/1991 | Whetten | 359/59 |
| 5,103,330 | 4/1992 | Fukami et al. | 359/59 |
| 5,162,901 | 11/1992 | Shimada et al. | 359/54 |

FOREIGN PATENT DOCUMENTS

| | | |
|---|---|---|
| 0328810 | 8/1989 | European Pat. Off. . |
| 0375233 | 6/1990 | European Pat. Off. . |
| 0438138 | 7/1991 | European Pat. Off. ........... 359/55 |
| 59-082769 | 5/1984 | Japan . |
| 59-119322 | 7/1984 | Japan . |
| 60-236266 | 11/1985 | Japan . |
| 62-2420 | 1/1987 | Japan . |
| 1-282522 | 11/1989 | Japan . |
| 1-283519 | 11/1989 | Japan . |
| 2-156227 | 6/1990 | Japan . |
| 2-221936 | 9/1990 | Japan . |
| 2-275927 | 11/1990 | Japan . |
| 2-284120 | 11/1990 | Japan . |
| 2175429 | 11/1986 | United Kingdom . |

OTHER PUBLICATIONS

"A Large-Area High-Resolution Active-Matrix Color LCD," Sunata et al, Proceedings of the Society for Information Display (SID) vol. 28 (1987), No. 2, New York, N.Y., pp. 141-144.

*Primary Examiner*—William L. Sikes
*Assistant Examiner*—Anita Pellman Gross
*Attorney, Agent, or Firm*—Nixon & Vanderhye

[57] ABSTRACT

An active matrix substrate which includes a plurality of pixel electrodes arranged in a matrix over an insulating substrate, with each of the pixel electrodes having a transparent conductive film including an additional capacitance portion and a non-additional capacitance portion. Additional capacitance electrodes are capacitively coupled to said additional capacitance portions through at least one insulating film. A conductive film electrically connects the additional capacitance portion to the non-additional capacitance portion of each of the pixel electrodes. The transparent conductive film of each of said pixel electrodes includes a portion for covering the conductive film, the portion for covering having a wider width than a width of the conductive film.

3 Claims, 5 Drawing Sheets

ACTIVE MATRIX SUBSTRATE WITH CONDUCTIVE FILM COVERING TRANSPARENT CONDUCTIVE FILM PORTION CONNECTING ADDITIONAL AND NON-ADDITIONAL CAPACITANCE PORTIONS OF PIXEL ELECTRODE

BACKGROUND OF THE INVENTION

1. Field of the Invention

The present invention relates to an active matrix substrate to construct a display device in combination with a display medium such as liquid crystal.

2. Description of the Prior Art

An active matrix display device includes a substrate and pixel electrodes arranged in a matrix on the substrate, each pixel electrode having active elements such as a thin film transistor (hereinafter called the "TFT"). The pixel electrodes are charged when the TFTs are on. Until all the pixel electrodes for one frame become on, the electric charge is held. The liquid crystal sealed between the charged pixel electrodes and counter electrodes thereto is optically modulated and displayed. The active matrix display device has advantages of being thin, light-weight, and consuming less electric power, and is in wide use for flat display panels.

Referring to FIG. 5, an example of the conventional active matrix substrate will be described:

Pixel electrodes 2 are arranged in a matrix on a glass substrate, and each pixel electrode is provided with a TFT 3 as an active element. Gate buses 4 and source buses 5 are disposed between the pixel electrodes 2 so as to drive the TFTs 3. In order to increase the capacity of pixel electrodes 2 for holding electric charge during a period for one frame, additional capacitance electrodes 15 are disposed under the pixel electrodes 2. Alternatively, the additional capacitances can share the gate buses 4.

The fabrication of such active matrix substrates requires a series of complex processes which consist of fabricating TFTs and etching. The TFTs 3 and the additional capacitance electrodes 15 must be provided to each of such a huge number of pixel electrodes as 100,000 or more without scarifying or losing the electric characteristics. To achieve this, a precision process control is required to maintain the electric characteristics of each pixel electrode.

However, even if the manufacturing process is precisely controlled, leakage is likely to occur between the additional capacitance electrodes and the pixel electrodes, thereby resulting in defective pixel electrodes. The defective pixel electrodes are detected and repaired at the time of quality check. The defective pixel electrodes are repaired by removing a leak occurring portion of the pixel electrode 2 on the additional capacitance electrode 15. The defective portion of the pixel electrode is cut with a suitable trimmer, or supersonic wave cutter, etc. The cutting involves difficulty because the length to be cut is equal to the length of a side of the pixel electrode, and in addition, takes a long time.

In order to facilitate the cutting of a defective pixel electrode, the active matrix substrate shown in FIG. 6 is used. The substrate of FIG. 6 is the same as the one shown in FIG. 5 except that the pixel electrode 2 is divided into the additional capacitance portion 2b and the non-additional capacitance portion 2a, and that a conductive film 30 is disposed so as to electrically connect the additional capacitance portion 2b and the non-additional capacitance portion 2a. FIG. 7 is a sectional view taken line P-P of FIG. 6 showing the vicinity of the TFT 3. FIG. 8 is a sectional view taken line Q-Q of the FIG. 6.

In this type of active matrix, the gate buses 4, gate electrodes 7 branched from the gate buses 4 and an additional capacitance electrode 15 are formed on a glass substrate 6, and an insulating film 8 is disposed to cover them by anodic oxidation. Finally the gate insulating film 9 made by the plasma CVD is formed over the whole surface of the substrate 6. A semi-conductive film 10 is formed above the gate electrode 7 over the insulating films 8 and 9. On the semi-conductive film 10, a first source electrode 11 and a second source electrode 12, which are connected to the source bus 5, and a first drain electrode 13 and a second drain electrode 14, which supply electric charges to the pixel electrodes 2, are respectively stacked. As shown in FIG. 6, the pixel electrode 2 is divided into an additional capacitance portion 2b located in opposition to the additional capacitance electrode 15 and other non-additional capacitance portions 2a.

A conductive film 30 is formed on the gate insulating film at the same time as when the source bus 5, the second source electrode 12 and the second drain electrode 14 are formed. The additional capacitance portion 2b and the non-additional capacitance portion 2a of the pixel electrode 2 are formed on the gate insulation film 9, and the edges of these portions 2b and 2a are formed on the conductive films 30.

An advantage of this construction is that a defective pixel electrode can be easily repaired by cutting the conductive film 30 with a laser beam when leakage occurs between the additional capacitance portion 2b and the additional capacitance electrode 15 composing the pixel electrode 2 so that the additional capacitance portion 2b and the non-additional capacitance portion 2a are electrically disconnected. The width of the conductive film 30 is so short that the conductive film 30 may be easily cut.

In order to simplify the manufacturing process, the conductive film 30 and the source bus wiring 5 are formed on the active matrix substrate at the same time. As a result, the conductive film 30 has a thickness of about 200 to 400 nm which is the same thickness with that of the source bus wiring 5. In contrast, since the additional capacitance portion 2b and the non-additional capacitance portion 2a, both of which are made of transparent conductive film, are formed to the thickness of about 100 nm, a step cut portion 40 may occur in the additional capacitance portion 2b and the non-additional capacitance portion 2a formed on the step portion made by the thick conductive film 30 as shown in FIG. 9. Moreover, when patterns of the additional capacitance portion 2b and non-additional capacitance portion 2a are formed by etching, the etchant is likely to penetrate into the step portion, so that the step cut portions 40 may detrimentally spread. The increased number of step cut portions result in poor characteristics for holding electric charges stored in the pixel electrode 2.

SUMMARY OF THE INVENTION

The active matrix substrate of this invention, which overcomes the above-discussed and numerous other disadvantages and deficiencies of the prior art, comprises a transparent conductive film including an additional capacitance portion and a non-additional capacitance portion, the transparent conductive film comprising pixel electrodes arranged in matrix on an insulating substrate, the additional capacitance electrodes facing each other containing the additional capacitance portion and the insulating films therebetween, and a conductive film electronically connecting the additional capacitance portion and the non-additional capacitance portion, wherein the transparent conductive film has a wider width than the conductive film and covers the conductive film.

Alternatively, the active matrix substrate comprises a transparent conductive film including an additional capacitance portion and a non-additional capacitance portion, the transparent conductive film comprising pixel electrodes arranged in matrix on an insulating substrate, the additional capacitance electrodes facing each other containing the additional capacitance portion and the insulating films therebetween, and a conductive film electronically connecting the additional capacitance portion and the non-additional capacitance portion, wherein the transparent conductive film includes a portion having a wider width than the conductive film and covers the conductive film.

Alternatively, the matrix substrate comprises transparent conductive film including two additional capacitance portions and a non-additional capacitance portion, the transparent conductive film comprising pixel electrodes arranged in matrix on an insulating substrate, the additional capacitance electrodes facing each other containing the additional capacitance portion and the insulating films therebetween, and a conductive film electrically connecting the additional capacitance portion and the non-additional capacitance portion, wherein the transparent conductive film has a wider width than the conductive film and covers the conductive film.

Thus, the invention described herein makes possible the objective of providing an active matrix substrate electrically connecting the additional capacitance portion and the non-additional capacitance portion with certainty.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Example 1

Figure 7:
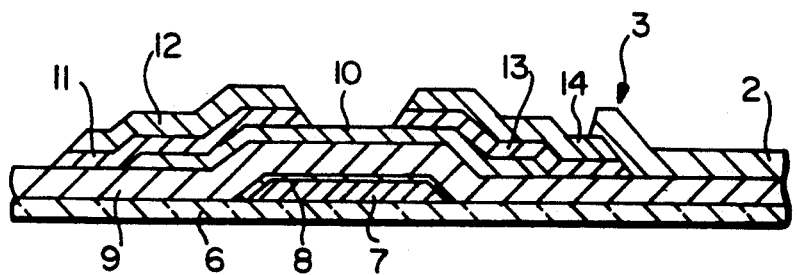
FIG. 7 is a sectional view taken along the line X-X in FIG. 1 and the line P-P in FIG. 6.
Figure 8:
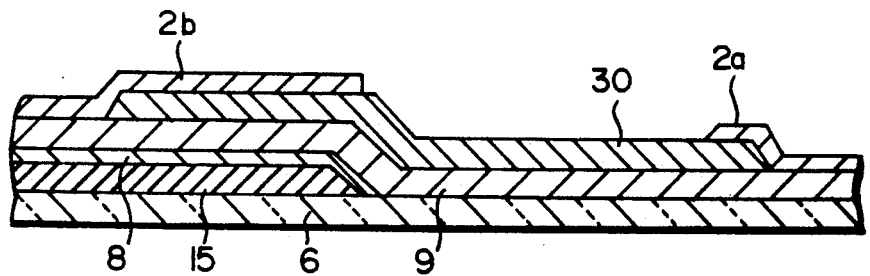
FIG. 8 is a sectional view taken along the line Q-Q of FIG. 6.
Figure 9:
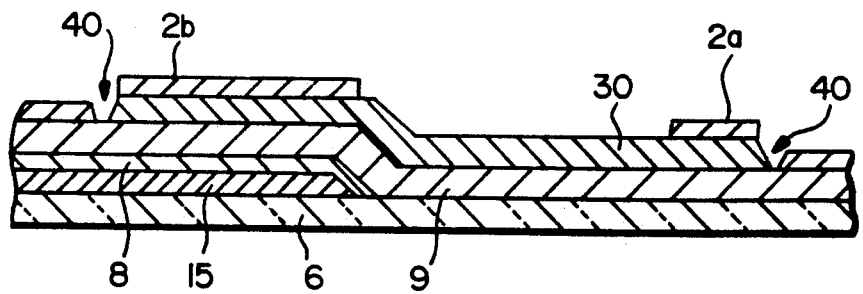
FIG. 9 is a sectional view showing a step cut portion occurring in an additional capacitance portion and a non-additional capacitance portion of a pixel electrode.

The illustrated active matrix substrate comprises a glass substrate 6, a gate bus 4 formed on the glass substrate, gate electrodes 7 diverged from the gate bus 4, an additional capacitance electrode 15, and an insulating film 8 formed by anodic oxidation thereon, and additionally comprises a gate insulating film 9 formed on the whole of the substrate 6 by a plasma CVD method. As is shown in FIG. 7, a semi-conductive film 10 is formed above the gate electrode 7 holding the insulating films 8 and 9. In order to supply electric charges to the pixel electrode 2 on the semi-conductive film 10, the first source electrode 11 and the second source electrode 12 connected with the source bus 5, the first drain electrode 13 and the second drain electrode 14 are piled in sequence respectively. The pixel electrode 2, as is shown in FIG. 1, is divided into the additional capacitance portion 2b facing the additional capacitance electrode 15 and the other non-additional capacitance portion 2a.

Figure 1:
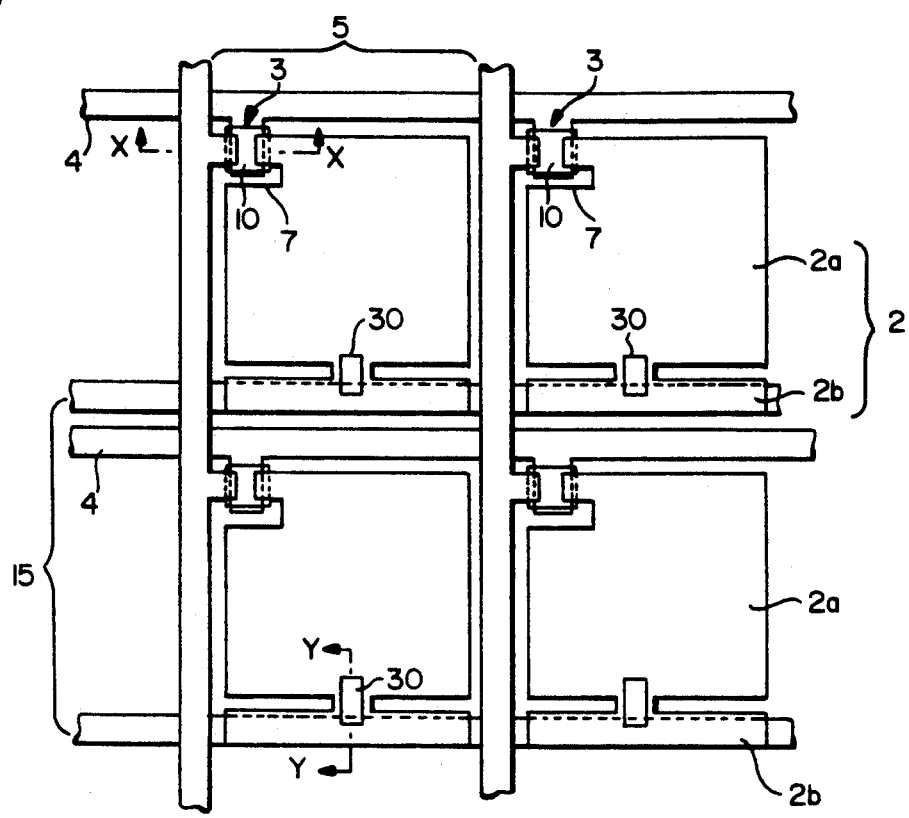
FIG. 1 is a plan view of an active matrix substrate as an example of the present invention.

As is shown in FIG. 1, the additional capacitance portion 2b and the non-additional capacitance portion 2a are electrically connected by conductive film 30. The conductive film 30, as shown in FIG. 4, is formed on the gate insulating film 9 at the same time as when the source bus 5 is formed, the second source electrode 12 and the second drain electrode 14.

Figure 4:
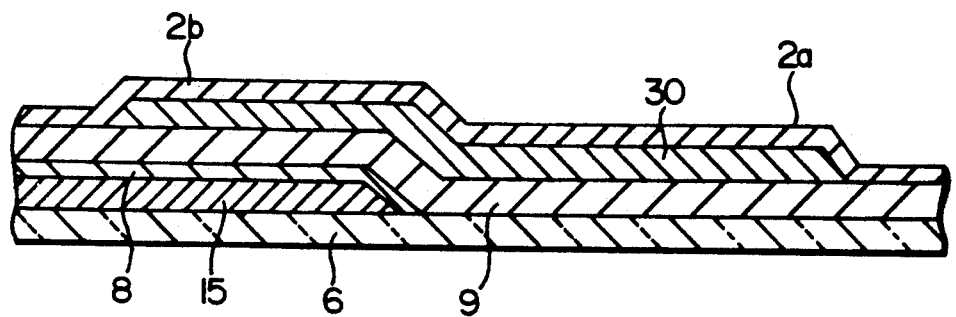
FIG. 4 is a sectional view taken along the line y-y in FIG. 1.
Figure 5:
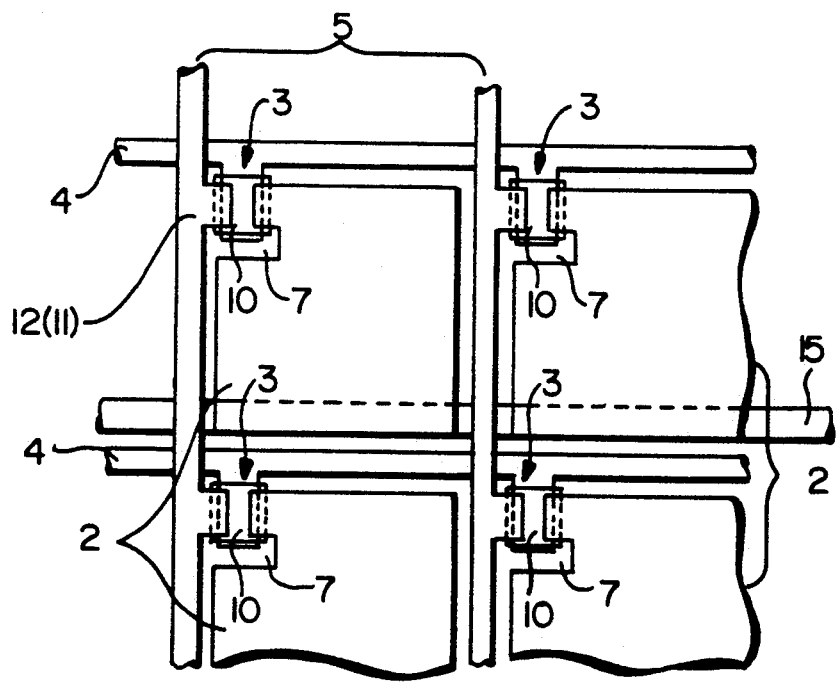
FIG. 5 is a plan view of a conventional active matrix substrate.
Figure 6:
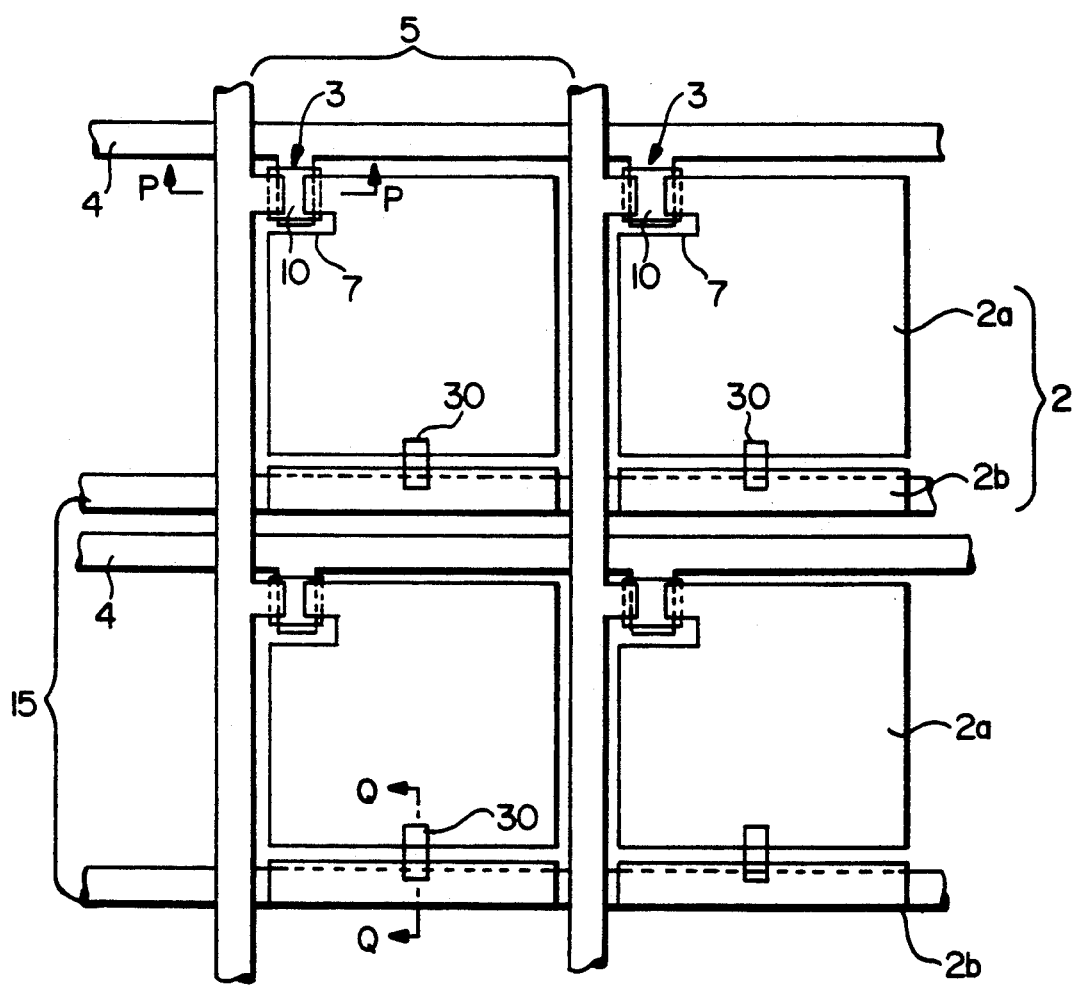
FIG. 6 is a plan view of a modified active matrix substrate.

As shown in FIG. 4, transparent conductive films formed when the additional capacitance portion 2b and the non-additional capacitance portion 2a are formed are piled on the conductive film 30 between the additional capacitance portion 2b and the non-additional capacitance portion 2a. The transparent conductive film covering the conductive film is formed wider than the conductive film 30. Accordingly, the transparent conductive film between the additional capacitance portion 2b and the non-additional capacitance portion 2a is also formed on the side portion of the conductive film 30. The width of the transparent conductive film formed on the side of the conductive film is not larger than 3 $\mu$m.

The illustrated active matrix is advantageous in that the transparent conductive film formed on the side of the conductive film 30 between the additional capacitance portion 2b and the non-additional capacitance portion 2a is not affected by the step portion of the conductive film 30. The continuity between the additional capacitance portion 2b and the conductive film 30 and also between the non-additional capacitance portion 2a and the conductive film 30 is maintained, even if the step cut occurs in the transparent conductive film formed on the side of the conductive film 30. If the transparent conductive film 30 formed on the side of the conductive film is not larger than 3 $\mu$m in width at either side thereof, the additional capacitance portion 2b and the non-additional capacitance portion 2a are easy to cut off with laser light irradiation. When the width of the transparent conductive film is wider than the conductive film 30, it is hard for the etchant to penetrate into the step portion of the conductive film 30.

Example 2

Figure 2:
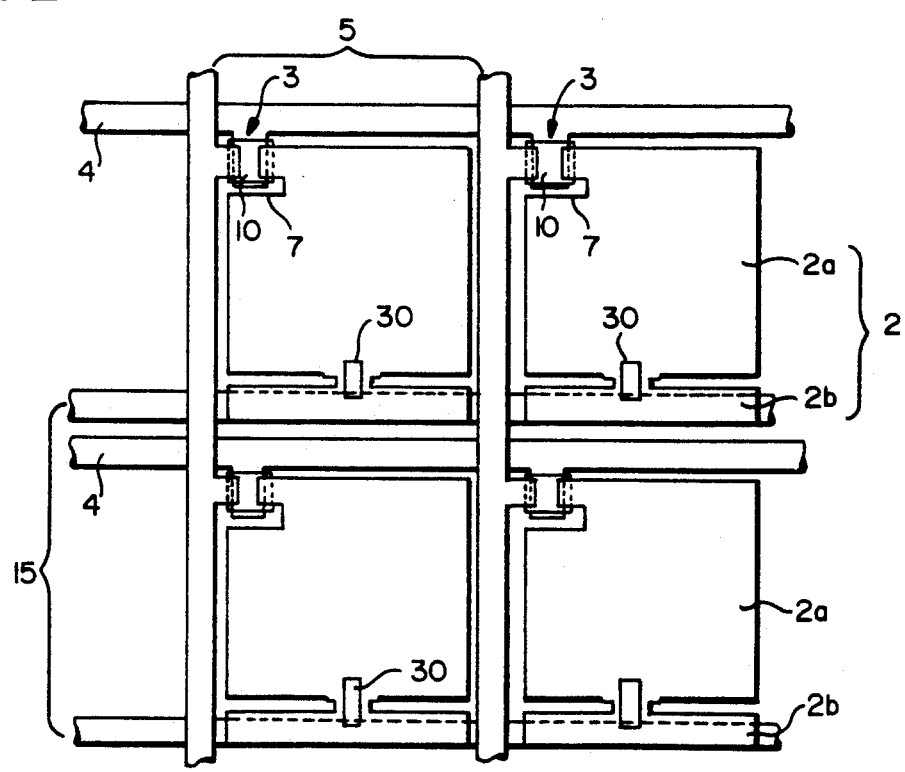
FIG. 2 is a plan view of another example of the present invention.

Referring to FIG. 2, a second example will be described:

In this example, the transparent conductive film formed on the conductive film 30 between the additional capacitance portion 2b and the non-additional capacitance portion 2a has a larger width than that of Example 1 and only partially not larger than 3 μm. This construction has the same effect as that of Example 1.

Example 3

Figure 3:
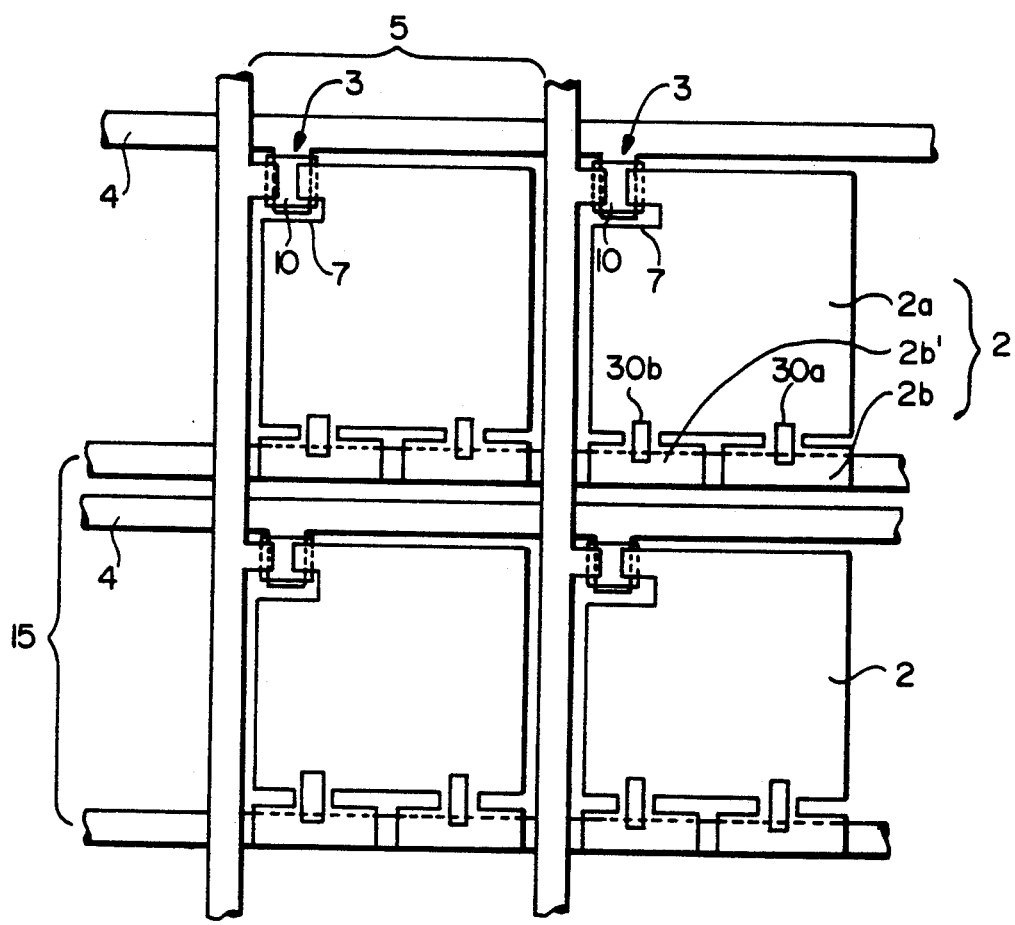
FIG. 3 is a plan view of a third example of the present invention, wherein two conductive films are includes.

Referring to FIG. 3, a third example will be described:

The pixel electrode 2 includes two additional capacitance portions 2b and 2b' which include the conductive films 30a and 30b respectively corresponding to the additional capacitance portions 2b and 2b'. The construction in the vicinity of the conductive films 30a and 30b is the same with that of the conductive film 30 in Example 1.

In Example 3, if an insulation failure occurs between the additional capacitance portion 2b and the additional capacitance electrode 15, the conductive film 30 between the additional capacitance portion 2b and the non-additional capacitance portion 2a as well as the transparent conductive film 30 on the conductive film are cut in a known manner such as a laser irradiation, thereby separating the additional capacitance portion 2b from the non-additional capacitance portion 2a. As a result, the non-additional capacitance portion 2a and the other additional capacitance portion 2b' can maintain the function as a pixel electrode 2.

More specifically, this example does not deteriorate the characteristics of electric charge holding, because the non-additional capacitance portion 2a and other additional capacitance portion 2b' are kept in contact with each other. When insulation failure occurs between the additional capacitance portion 2b' and the additional capacitance electrode 15, the conductive portion 30b between the additional capacitance portion 2b' and the non-additional capacitance portion 2a is separated, thereby reconstructing the pixel electrode 2 by the non-additional capacitance portion 2a and the additional capacitance portion 2b. In this example, any insulation failure portion can be removed readily and easily without changing the function of additional capacitance.

In Examples 1 to 3, the additional capacitance electrode 15 is disposed separately from the gate bus 4. However, the present invention can be applied to an active matrix substrate having the additional capacitance made in one piece with the gate bus 4 adjacent thereto.

As described above, according to the present invention, any pixel defect due to a leak between the additional capacitance portion and the additional capacitance electrode can be easily repaired by cutting off the conductive film connecting the additional capacitance portion and the non-additional capacitance portion and the transparent conductive film on the conductive film. As the result, the production yield of the active matrix substrate can be increased.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An active matrix substrate comprising:
   a plurality of pixel electrodes arranged in a matrix over an insulating substrate, each of said pixel electrodes having a transparent conductive film including an additional capacitance portion and a non-additional capacitance portion;
   additional capacitance electrodes capacitively coupled to said additional capacitance portions through at least one insulating film; and
   a conductive film electrically connecting the additional capacitance portion to the non-additional capacitance portion of each of said pixel electrodes;
   wherein the transparent conductive film of each of said pixel electrodes includes a portion for covering the conductive film, said portion for covering having a wider width than a width of the conductive film.

2. An active matrix substrate comprising:
   a plurality of pixel electrodes arranged in a matrix on an insulating substrate, each of said pixel electrodes having a transparent conductive film including at least two additional capacitance portions and a non-additional capacitance portion;
   additional capacitance electrodes capacitively coupled to said additional capacitance portions through at least one insulating film; and
   conductive films for electrically connecting said at least two additional capacitance portions to said non-additional capacitance portion of each of said pixel electrodes;
   wherein the transparent conductive film of each of said pixel electrodes includes portions for covering the conductive films, each of said portions for covering having a wider width than a width of each of the conductive films.

3. An active matrix substrate comprising:
   a plurality of pixel electrodes arranged in a matrix over an insulating substrate, each of said pixel electrodes having a transparent conductive film including an additional capacitance portion and a non-additional capacitance portion;
   additional capacitance electrodes capacitively coupled to said additional capacitance portions through at least one insulating film;
   a conductive connector film electrically connecting the additional capacitance portion to the non-additional capacitance portion of each of said pixel electrodes;
   a covering portion of said transparent conductive film covering the connector film, said covering portion having a wider width than a width of the conductive film, said covering portion having a step region overlying an edge of said connector film adjacent said transparent conductive film, and
   a defect step cut in said covering portion substantially at said step region and where said covering portion conducts electricity around said step cut.

* * * * *